United States Patent [19]

Hayasaki

[11] Patent Number: 4,991,466
[45] Date of Patent: Feb. 12, 1991

[54] HYDRAULIC CIRCUIT FOR SUPPLYING BASE PRESSURE TO SOLENOID IN AN AUTOMATIC TRANSMISSION

[75] Inventor: Koichi Hayasaki, Fujisawa, Japan
[73] Assignee: Nissan Motor Co., Ltd., Yokohama, Japan
[21] Appl. No.: 378,091
[22] Filed: Jul. 11, 1989

[30] Foreign Application Priority Data

Jul. 11, 1988 [JP] Japan ............... 63-170791

[51] Int. Cl.⁵ .................................. B60K 41/06
[52] U.S. Cl. .................................... 74/867
[58] Field of Search ................. 74/866, 867, 868

[56] References Cited

U.S. PATENT DOCUMENTS

| | | | |
|---|---|---|---|
| 4,494,423 | 1/1985 | McCarthy et al. | 74/867 X |
| 4,534,244 | 8/1985 | Hiramatsu | 74/867 X |
| 4,616,531 | 10/1986 | Ogasawara et al. | 74/866 |
| 4,680,992 | 7/1987 | Hayasaki et al. | 74/869 |
| 4,722,250 | 2/1988 | Samiya et al. | 74/867 |
| 4,730,521 | 3/1988 | Hayasaki et al. | 74/867 |
| 4,751,858 | 6/1988 | Iwatsuki et al. | 74/867 |
| 4,763,545 | 8/1988 | Shibayama et al. | 74/868 |
| 4,807,496 | 2/1989 | Hayasaki et al. | 74/866 |
| 4,843,920 | 7/1989 | Hayasaki et al. | 74/867 X |

OTHER PUBLICATIONS

Service Manual for Nissan Full-Range Electronically Controlled Automatic Transmission, Mar. 1987.

*Primary Examiner*—Dwight Diehl
*Attorney, Agent, or Firm*—Foley & Lardner, Schwartz, Jeffery, Schwaab, Mack, Blumenthal & Evans

[57] ABSTRACT

A hydraulic circuit for an automatic transmission is disclosed, in which the line pressure generated by the regulator valve is provided to the on-off solenoids and the pilot pressure generated by the pilot valve to the duty solenoids.

7 Claims, 1 Drawing Sheet

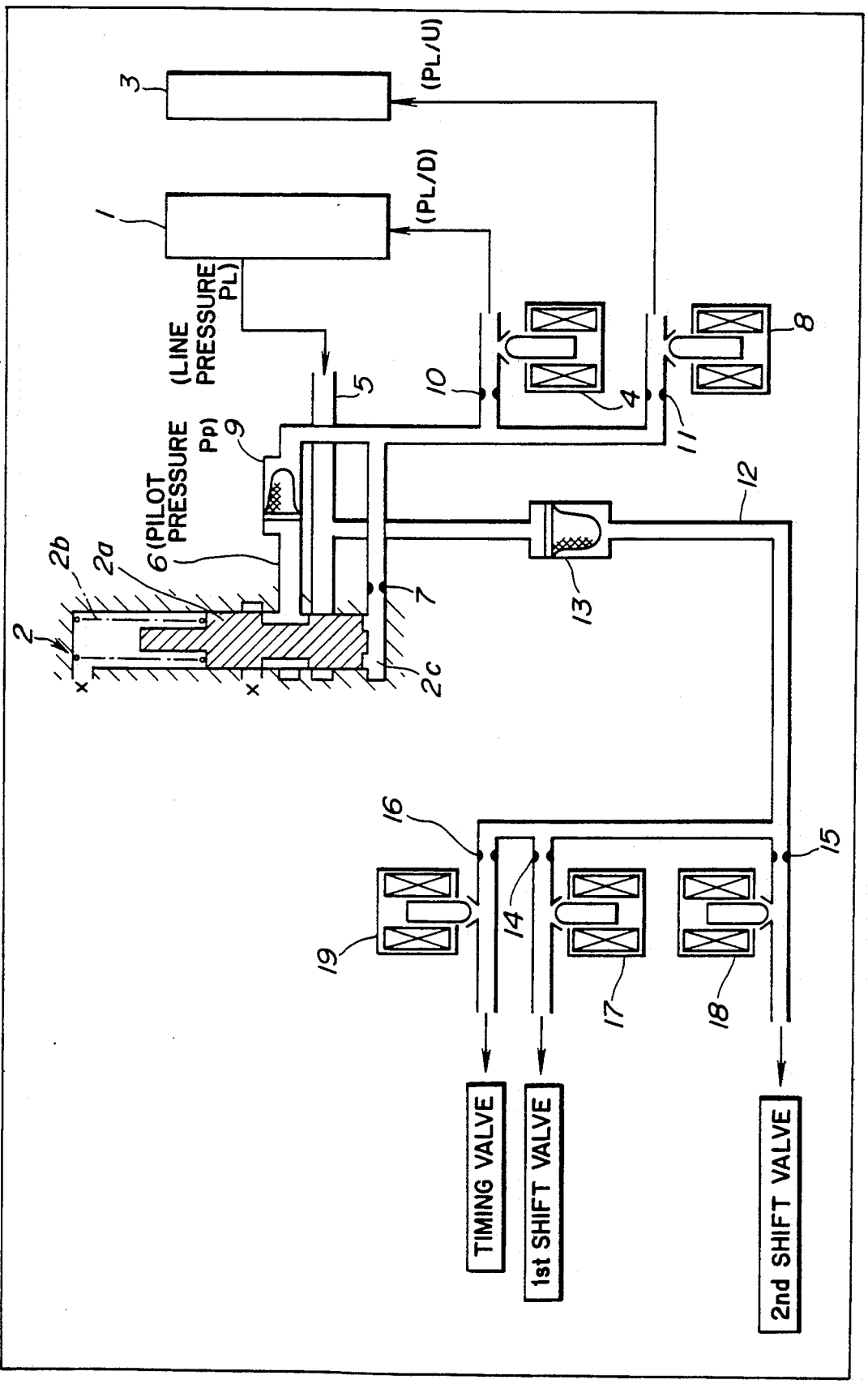

HYDRAULIC CIRCUIT FOR SUPPLYING BASE PRESSURE TO SOLENOID IN AN AUTOMATIC TRANSMISSION

BACKGROUND OF THE INVENTION

1. Field of the Invention

The present invention relates to a hydraulic circuit for an automatic transmission.

2. Description of the Prior Art

An automatic transmission is known which has a plurality of hydraulically operated friction elements and is conditioned in a desired one of a plurality of gear positions by activating selected one or more of the plurality of friction elements. For controlling the supply of servo activating fluid to and discharge thereof from the friction elements, a hydraulic circuit is provided which includes a regulator valve which generates a line pressure, a manual valve, and a plurality of shift valves. These shift valves are controlled by a plurality of shift solenoids of the on-off controlled type. The operation of the regulator valve is modulated by the operation of a line pressure solenoid of the duty controlled type such that the magnitude of the line pressure is varied with variation in duty supplied to the line pressure solenoid. For controlling a lock-up type torque converter, the degree of engagement of a lock-up clutch is controlled in a variable manner by the operation of a lock-up solenoid of the duty controlled type. This automatic transmission is described in detail in a publication "Service Manual for NISSAN FULL-RANGE ELECTRONICALLY CONTROLLED AUTOMATIC TRANSMISSION OF THE RE4OR01A TYPE (A261C07)" published on Mar. 1987 by NISSAN MOTOR CO., LTD.

In the known automatic transmission, there is provided a pilot valve which regulates the line pressure supplied thereto to generate a constant (pilot) hydraulic pressure which is distributed to the pressure regulating portion of the above-mentioned solenoids.

The on-off solenoid receives the pilot pressure as its base pressure and a solenoid pressure which takes a high level as high as the pilot pressure or a low level which is as high as zero pressure in response to a change in On or OFF stats of the solenoid. The duty solenoid also receives the pilot pressure as its base pressure but generates a solenoid pressure which continuously varies from the low level to the high level with variation of duty which the solenoid operates to. The duty is expressed in terms of a percentage of the time length of ON state to the time length of OFF state within a predetermined period of time.

In the hydraulic circuit, it is necessary to keep the level of pilot pressure constant to keep the predetermined relation of the level of solenoid pressure generated by the duty solenoid with respect to the duty. However, there is a potential difficulty to keep the level of the pilot pressure constant if all of on-off solenoids should switch simultaneously to drain hydraulic fluid.

Accordingly, an object of the present invention is to improve a hydraulic circuit for an automatic transmission of the above-mentioned type such that the above-mentioned potential difficulty is removed.

SUMMARY OF THE INVENTION

According to the present invention, there is provided a hydraulic circuit for an automatic transmission wherein the on-off solenoids uses as a base pressure a hydraulic fluid pressure which is different from a constant hydraulic fluid pressure which is used as a base pressure for the duty solenoids.

According to a specific aspect of the present invention, there is provided a hydraulic circuit for an automatic transmission having different friction elements which are selectively activated to establish one of a plurality of gear positions, the hydraulic circuit including:

means for generating a line pressure,
means for communicating with said line pressure to generate a constant pressure,
first solenoid means of the ON-OFF controlled type for regulating said line pressure as a base pressure to generate a first solenoid pressure, and
second solenoid means of the duty controlled type for regulating said constant pressure as a base pressure to generate a second solenoid pressure.

BRIEF DESCRIPTION OF THE DRAWINGS

The accompanying drawing is a diagrammatic view illustrating an embodiment of a hydraulic circuit for an automatic transmission according to the present invention.

DETAILED DESCRIPTION OF THE INVENTION

Referring to the accompanying drawing, there is shown an embodiment of a hydraulic circuit for an automatic transmission according to the present invention. In the drawing, a reference numeral 1 denotes a regulator valve, a numeral 2 a pilot valve, and a numeral 3 a lock-up control valve, respectively. The regulator valve 1 operates in response to a pressure $P_{L/D}$ outputted from a line pressure duty solenoid 4, thereby regulating the pressure of a hydraulic fluid from a pump (not shown) to a line pressure $P_L$. The pilot valve 2 is provided with a spool 2a biased downward by a spring 2b as viewed in the drawing, and a chamber 2c on the side of the spool 2a opposite to the spring 2b. The line pressure $P_L$ is supplied to the pilot valve 2 through a circuit 5, pilot pressure $P_p$ is induced by decreasing the line pressure $P_L$ to a given value which is determined by the force of the spring 2b and is outputted to a circuit 6. For performing the pressure regulation, the pilot pressure $P_p$ is fed back to the chamber 2c through an orifice 7. The lock-up control valve 3 operates in response to a pressure $P_{L/U}$ outputted from a lock-up duty solenoid 8, thereby carrying out a lock-up control of a torque converter. The pilot pressure $P_r$ of the circuit 6 is supplied, via a filter 9 and through orifices 10 and 11, to the line pressure duty solenoid 4 and lock-up duty solenoid 8. The pilot pressure $P_p$ is the base pressure of the two solenoids 4 and 8. Additionally, the line pressure $P_L$ of the circuit 5 is supplied, via a circuit 12 and a filter 13 and through orifices 14 to 16, to a first shift solenoid 17, a second shift solenoid 18 and a timing solenoid 19 which are of the on-off controlled type. The line pressure $P_L$ is the base pressure of the on-off solenoids 17 to 19. The solenoids 17 to 19 each output or do not output by their on-off operation the line pressure $P_L$ as the base pressure to a corresponding first shift valve, second shift valve and timing valve, and selectively perform hydraulic operation of a plurality of friction elements through the shift valves and at a given period of time through the timing valve.

The operation of the embodiment is as follows:

The line pressure duty solenoid 4 and the lock-up duty solenoid 8 each are electronically controlled in their drive duty, and are driven by means of the duty to regulate the pilot pressure $P_p$ to a value corresponding to the duty, thus outputting the pressures $P_{L/D}$ and $P_{L/U}$. The regulator valve 1 and the lock-up control valve 3 each operate in response to the pressures $P_{L/D}$ and $P_{L/U}$, thereby to perform control of the line pressure $P_L$ and lock-up control of the torque converter. The filter 9 eliminates dust in the hydraulic fluid to prevent choking and/or sticking of the valves 1 and 3. The solenoids 17 to 19 each are electronically controlled in their on-off operation, and output or do not output by the on-off operation their base pressure of the line pressure $P_L$ to the corresponding first shift valve, second shift valve and timing valve, and selectively perform hydraulic operation of a plurality of friction elements through the valves at a given period of time. The filter 13 eliminates dust in the hydraulic fluid to prevent choking and/or sticking of the valves 1 and 3. It is to be noted that, since the base pressure of the on-off solenoids 17 to 19 is the line pressure $P_L$ while the same of the duty solenoids 4 and 8 is the pilot pressure $P_p$, a sudden change in a consumption of the hydraulic fluid with switching of the on-off solenoids 17 to 19 may not vary the pilot pressure $P_p$ to be constant.

The on-off solenoids 17-19 selectively operate in either of two states, viz. ON and OFF state so that even if the on-off solenoids 17-19 receive as their base pressure the line pressure $P_L$ which is variable according to a driving condition of the motor vehicle, the no inconvenience is induced in practical use.

What is claimed is:

1. A hydraulic circuit for an automatic transmission comprising:
   means for generating a line pressure;
   means communicating with said line pressure for generating a constant pressure;
   first solenoid means of the two-state type communicating with said line pressure for generating a first solenoid pressure; and
   second solenoid means of the duty controlled type communicating with said constant pressure for generating a second solenoid pressure, said line pressure generating means being connected to said second solenoid means and operable in response to said second solenoid pressure.

2. A hydraulic circuit as defined in claim 1, wherein said line pressure generating means includes a regulator valve.

3. A hydraulic circuit as defined in claim 1, wherein said constant pressure generating means includes a pilot valve.

4. A hydraulic circuit as defined in claim 1, wherein said first solenoid means includes two solenoid valves and a timing valve.

5. A hydraulic circuit as defined in claim 1, wherein said second solenoid means includes a line pressure duty solenoid and a lock-up duty solenoid.

6. A hydraulic circuit for an automatic transmission comprising:
   a regulator valve means for generating a line pressure;
   a pilot valve means communicating with said line pressure for generating a constant pressure;
   a timing solenoid means of the two-state type communicating with said line pressure for generating a timing solenoid pressure;
   a shift solenoid means of the two-state type communicating with said line pressure for generating a shift solenoid pressure;
   a line pressure duty solenoid means of the duty controlled type communicating with said constant pressure for generating a line pressure duty solenoid pressure;
   a timing valve connected to said timing solenoid means and operable in response to said timing solenoid pressure; and
   a shift valve connected to said shift solenoid means and operable in response to said shift solenoid pressure,
   said regulator valve means being connected to said line pressure duty solenoid means and operable in response to said line pressure duty solenoid pressure.

7. A hydraulic circuit for an automatic transmission comprising:
   a regulator valve means for generating a line pressure;
   a pilot valve means communicating with said line pressure for generating a constant pressure;
   a timing solenoid means of the two-state type communicating with said line pressure for generating a timing solenoid pressure;
   a shift solenoid means of the two-state type communicating with said line pressure for generating a shift solenoid pressure;
   a line pressure duty solenoid means of the duty controlled type communicating with said constant pressure for generating a line pressure duty solenoid pressure;
   a lock-up duty solenoid means of the duty controlled type communicating with said constant pressure for generating a lock-up duty solenoid pressure;
   a timing valve connected to said timing solenoid means and operable in response to said timing solenoid pressure; and
   a shift valve connected to said shift solenoid means and operable in response to said shift solenoid pressure,
   said regulator valve means being connected to said line pressure duty solenoid means and operable in response to said line pressure duty solenoid pressure; and
   a lock-up control valve connected to said lock-up duty solenoid means and operable in response to said lock-up duty solenoid pressure.

* * * * *